US011087432B2

(12) United States Patent
Chen et al.

(10) Patent No.: US 11,087,432 B2
(45) Date of Patent: *Aug. 10, 2021

(54) MULTISTAGE NEURAL NETWORK PROCESSING USING A GRAPHICS PROCESSOR

(71) Applicant: Snap Inc., Santa Monica, CA (US)

(72) Inventors: Yanping Chen, San Jose, CA (US); Jaewook Chung, Mountain View, CA (US); Wisam Dakka, San Francisco, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,818

(22) Filed: May 1, 2020

(65) Prior Publication Data
US 2020/0258189 A1 Aug. 13, 2020

Related U.S. Application Data

(63) Continuation of application No. 16/659,561, filed on Oct. 21, 2019, now Pat. No. 10,672,096, which is a continuation of application No. 15/894,560, filed on Feb. 12, 2018, now Pat. No. 10,482,565.

(51) Int. Cl.
G06T 15/00 (2011.01)
G06T 1/20 (2006.01)
G06N 3/08 (2006.01)
G06N 3/04 (2006.01)
(Continued)

(52) U.S. Cl.
CPC ............ G06T 1/20 (2013.01); G06N 3/0454 (2013.01); G06N 3/063 (2013.01); G06N 3/084 (2013.01); G06T 11/001 (2013.01); G06T 15/005 (2013.01)

(58) Field of Classification Search
None
See application file for complete search history.

(56) References Cited

U.S. PATENT DOCUMENTS 5,754,939 A 5/1998 Herz et al.
6,038,295 A 3/2000 Mattes
6,158,044 A 12/2000 Tibbetts
(Continued)

FOREIGN PATENT DOCUMENTS

CA 2887596 A1 7/2015
WO WO-2012000107 A1 1/2012
(Continued)

OTHER PUBLICATIONS

Hassanat et al., "Color-based object segmentation method using artificial neural network", Elsevier, 2016. (Year: 2016).*
(Continued)

Primary Examiner — Nicholas R Wilson
(74) Attorney, Agent, or Firm — Schwegman Lundberg & Woessner, P.A.

(57) ABSTRACT

A multistage neural network system can store neural networks as shader programs on GPU memory. Neural network weights can be stored as shader objects or textures on the GPU memory. The GPU can receive a number of neural network image processing tasks to perform on images captured by a client device. The GPU can execute the tasks per driver parameters and display results in real time or near real time on the client device.

16 Claims, 16 Drawing Sheets

(51) Int. Cl.
*G06N 3/063* (2006.01)
*G06T 11/00* (2006.01)

(56) References Cited

U.S. PATENT DOCUMENTS

| | | |
|---|---|---|
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,482,565 B1 | 11/2019 | Chen et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |

(56) References Cited

U.S. PATENT DOCUMENTS

| | | |
|---|---|---|
| 2017/0295250 A1 | 10/2017 | Samaranayake et al. |
| 2017/0374003 A1 | 12/2017 | Allen et al. |
| 2017/0374508 A1 | 12/2017 | Davis et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

Nikko Strom, "Scalable Distributed DNN Training Using Commodity GPU Cloud Computing", ISCA, 2015. (Year: 2015).*

"U.S. Appl. No. 15/894,560, Non Final Office Action dated Apr. 2, 2019", 33 pgs.

"U.S. Appl. No. 15/894,560, Notice of Allowance dated Jul. 16, 2019", 5 pgs.

"U.S. Appl. No. 15/894,560, Response filed Jul. 2, 2019 to Non Final Office Action dated Apr. 2, 2019", 11 pgs.

"U.S. Appl. No. 16/659,561, Notice of Allowance dated Jan. 24, 2020", 8 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Harris, Mark, "An Easy Introduction to CUDA C and C++", NVIDIA Developer Blog, [Online] Retrieved from the Internet: <https://devblogs.nvidia.com/easy-introduction-cuda-c-and-c/>, (Oct. 31, 2012), 16 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Long, Jonathan, et al., "Fully Convolutional Networks for Semantic Segmentation", IEEE Conference on Computer Vision and Pattern Recognition (CVPR), Boston, MA, (Jun. 2015), 10 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Trapp, Matthias, et al., "Pictory: Combining Neural Style Transfer and Image Filtering", SIGGRAPH '17 Appy Hour, Los Angeles, CA, USA, (2017), 2 pgs.

Uetz, Rafael, et al., "Large-scale Object Recognition with CUDA-Accelerated Hierarchical neural networks", IEEE Intl. Conference on Intelligent Computing and Intelligent Systems, (2009), 6 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

U.S. Appl. No. 15/894,560 U.S. Pat. No. 10,482,565, filed Feb. 12, 2018, Multistage Neural Network Processing Using a Graphics Processor.

U.S. Appl. No. 16/659,561, filed Oct. 21, 2019, Multistage Neural Network Processing Using a Graphics.

* cited by examiner

MULTISTAGE NEURAL NETWORK PROCESSING USING A GRAPHICS PROCESSOR

CLAIM OF PRIORITY

This application is a continuation of and claims the benefit of priority of U.S. patent application Ser. No. 16/659,561, filed on Oct. 21, 2019, which is a continuation of and claims the benefit of priority of U.S. patent application Ser. No. 15/894,560, filed on Feb. 12, 2018, each of which is hereby incorporated by reference herein in their entireties.

TECHNICAL FIELD

The present disclosure generally relates to special-purpose machines that manage machine learning and improvements to such variants, and to the technologies by which such special-purpose machines become improved compared to other special-purpose machines for neural network processing using a graphics processing unit (GPU).

BACKGROUND

Neural networks can be configured for image processing. For example, a convolutional neural network can execute from a computer to apply image stylization. Neural network models tend to be large and execute slowly on devices with limited computational resources (e.g., mobile phones).

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, resource-constrained devices, such as mobile phones, struggle to execute neural network image manipulations in an efficient manner. To this end, a multistage neural network (NN) system can be implemented partially on a central processing unit (CPU) and partly on a graphics processing unit (GPU) to parallelize NN operations and enable NN-based image effects (e.g., style transfer, image segmentation) to be displayed in real time or near real time on a client device. The multistage NN system may store neural networks as shader programs on a memory of a GPU. Further, the weights of the neural networks can be stored as shader objects or textures on the memory of the GPU. When a program executes on a CPU, it can include code that initiates the shaders on the GPU via a GPU application programming interface (API). The GPU receives a number of NN-based tasks to perform and can organize them according to a GPU driver (e.g., an OpenGL driver for the given GPU hardware). Multiple NN-based tasks can be performed on the GPU in a serial or parallel process before one or more final results are returned to the CPU through the API for display on a display device (e.g., a screen of a smartphone).

Figure 1:
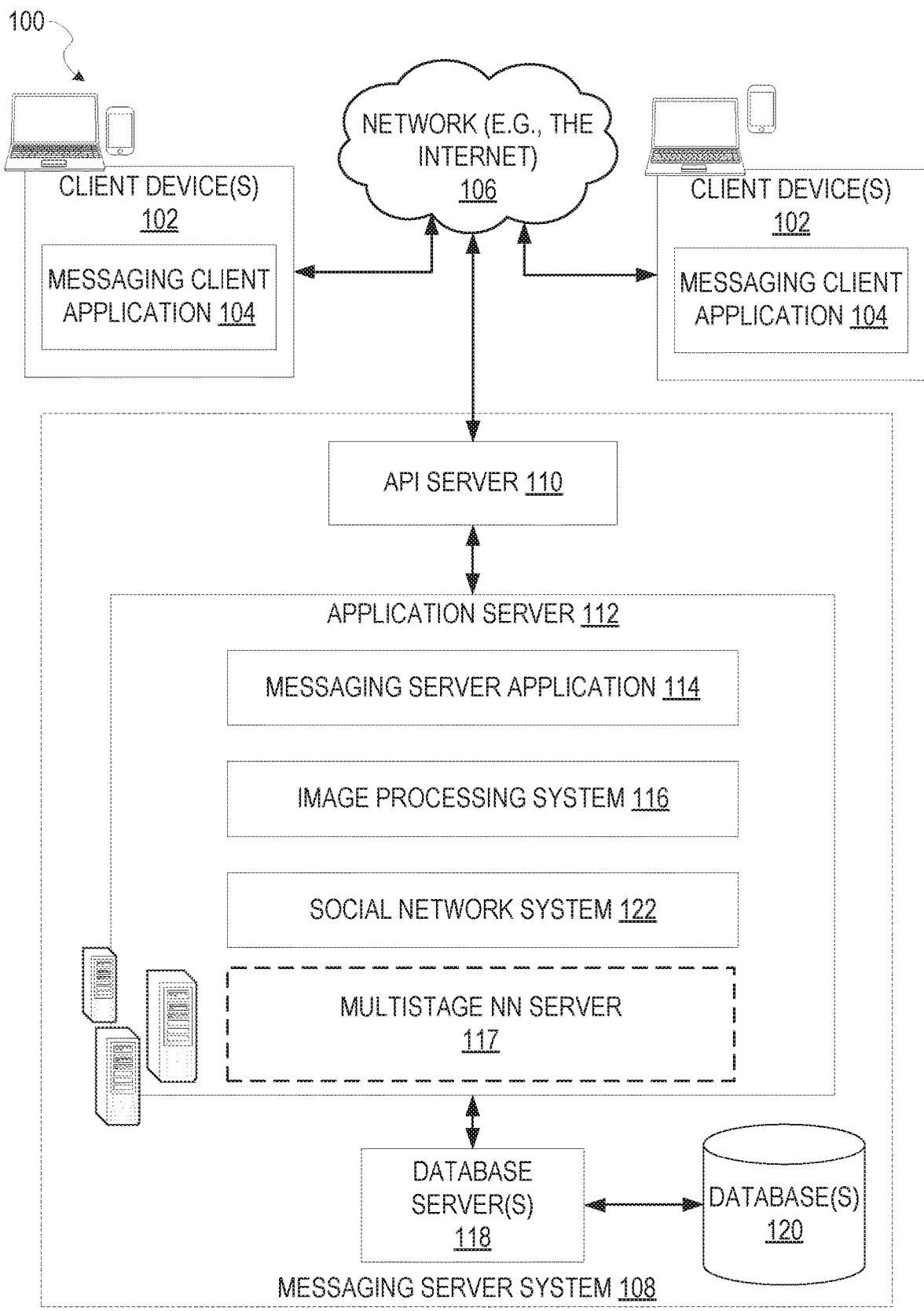
FIG. 1 is a block diagram showing an example messaging system for exchanging data (e.g., messages and associated content) over a network.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a multistage NN server 117, in some example embodiments. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

In some example embodiments, the multistage NN server 117 is located on a server remote from the client device 102. For example, as illustrated in FIG. 1, the application server 112 may host and execute the multistage NN server 117, which executes on a GPU of the application server 112.

The application server 112 is communicatively coupled to the database server 118, which facilitates access to the database 120 in which is stored data associated with messages processed by the messaging server application 114.

Figure 2:
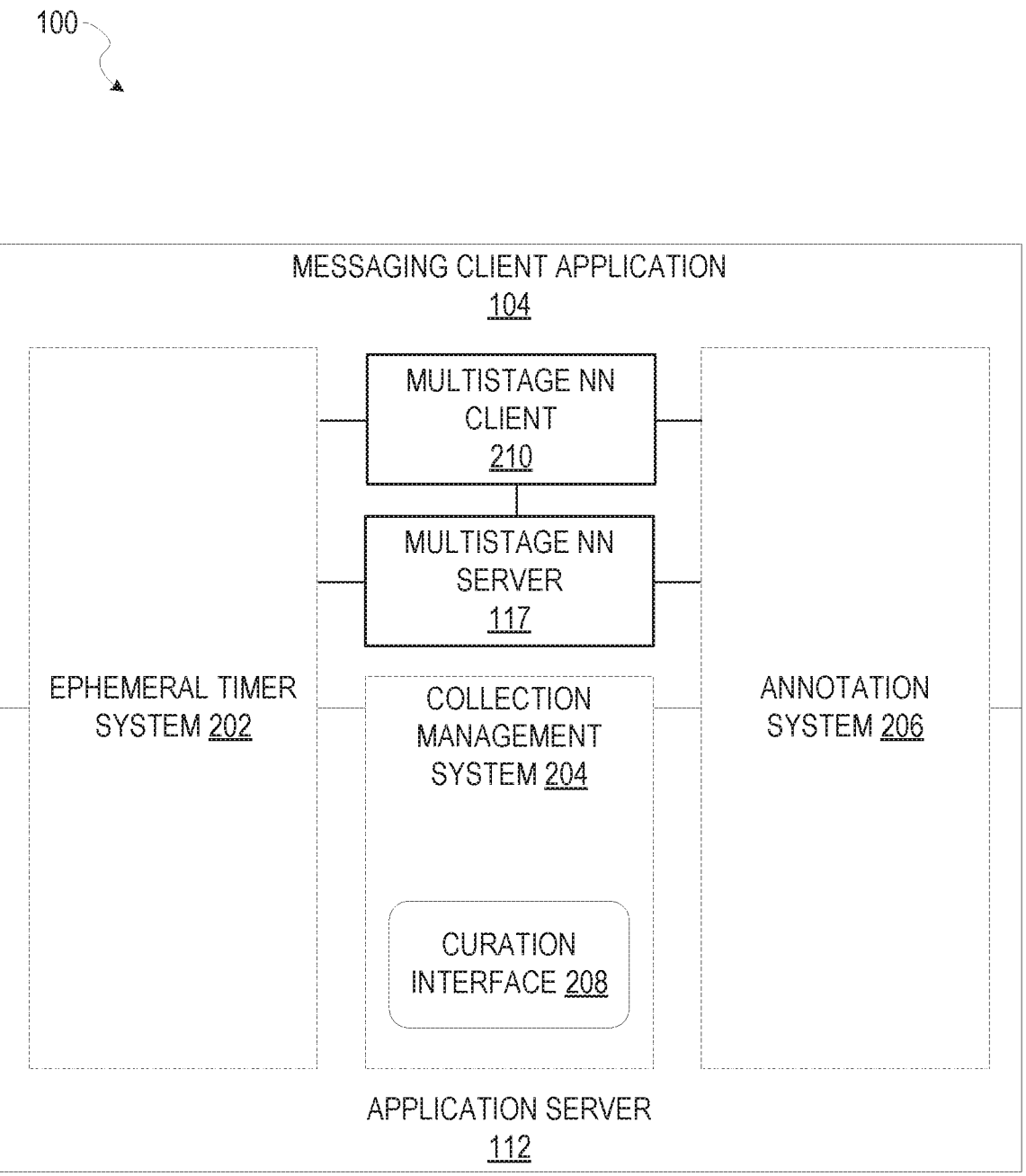
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, a multistage NN client 210, and a multistage NN server 117.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

As discussed in further detail below, the multistage NN client 210 may be executed from a CPU of a client device 102, and the multistage NN server 117 may execute from a GPU of the same client device 102. The multistage NN client 210 can store and execute shaders on the multistage NN server 117, which can be configured to implement neural network shaders. The weights of the neural network can be stored on memory accessible or otherwise local to the multistage NN server 117 (e.g., GPU memory). The multistage NN server 117 may execute a graphics platform such as OpenGL, which the multistage NN client 210 can access through an API (e.g., an OpenGL API). Although the multistage NN client 210 and multistage NN server 117 are discussed as having a client/server architecture for clarity, one of ordinary skill in the art will appreciate that in some example embodiments the multistage NN client 210 and multistage NN server 117 can be organized as a graphics pipeline instead (e.g., on a multicore chip having a CPU and an on-board GPU, e.g., an Intel i7 processor).

Figure 3:
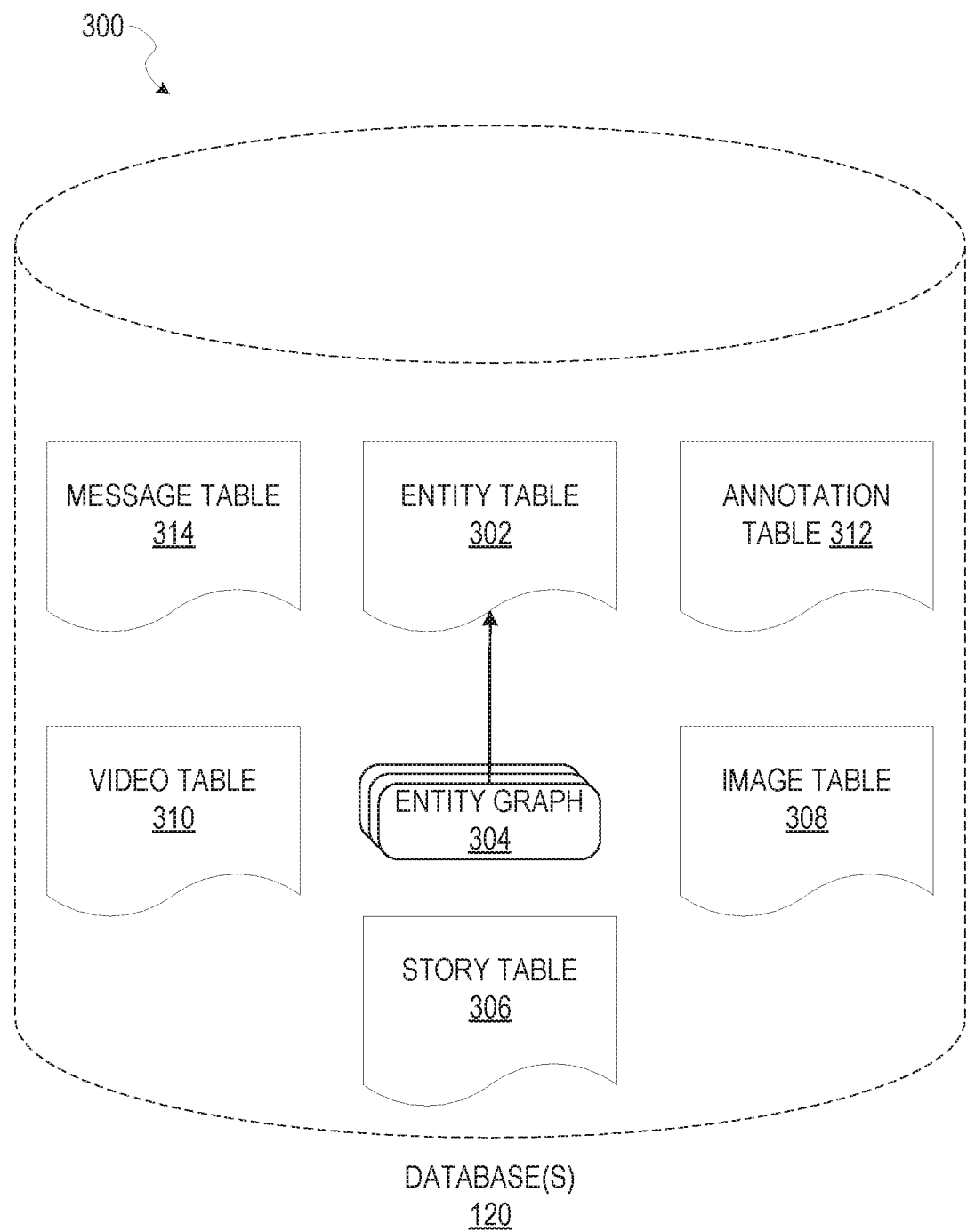
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
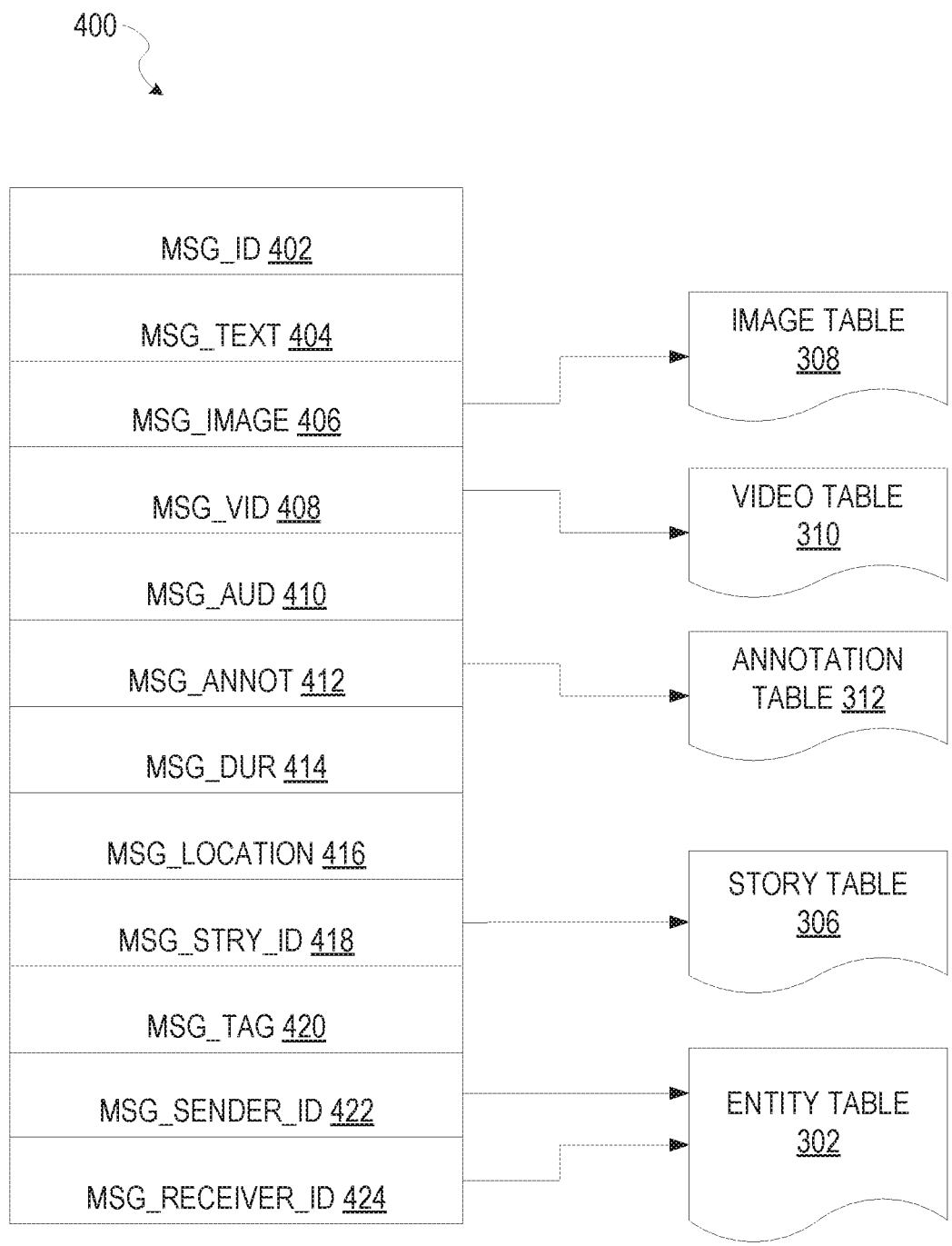
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
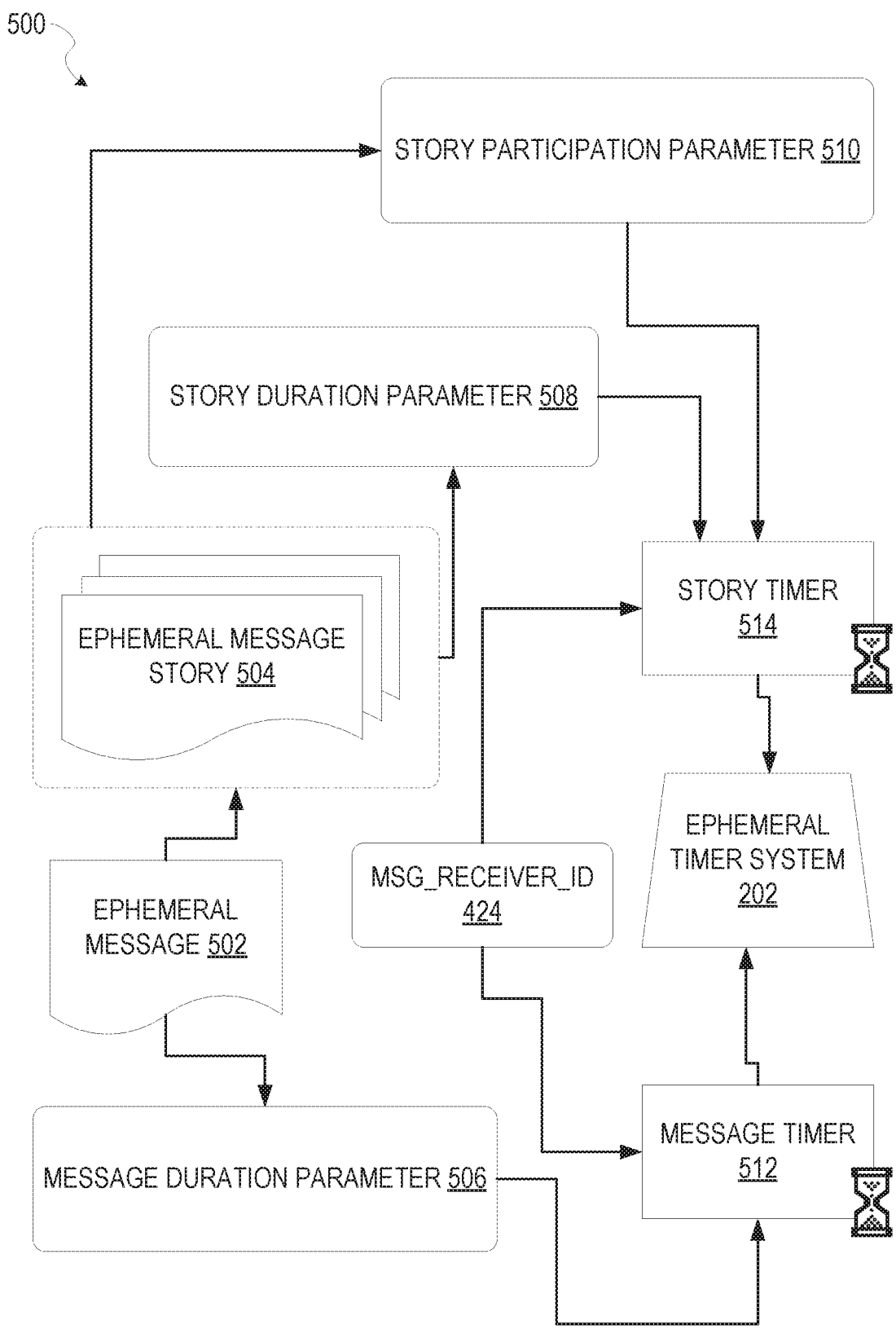
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504. The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring (via the story timer 514) in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6A:
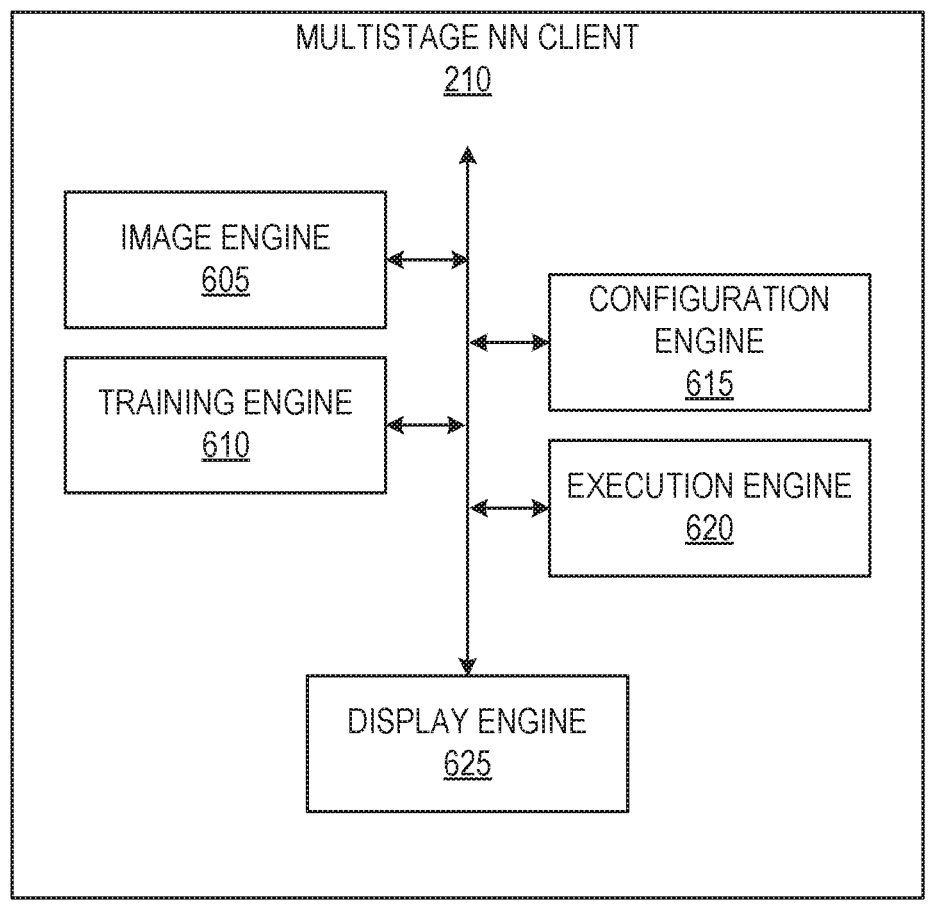
FIG. 6A shows internal functional components of a multistage neural network client, according to some example embodiments.
Figure 6B:
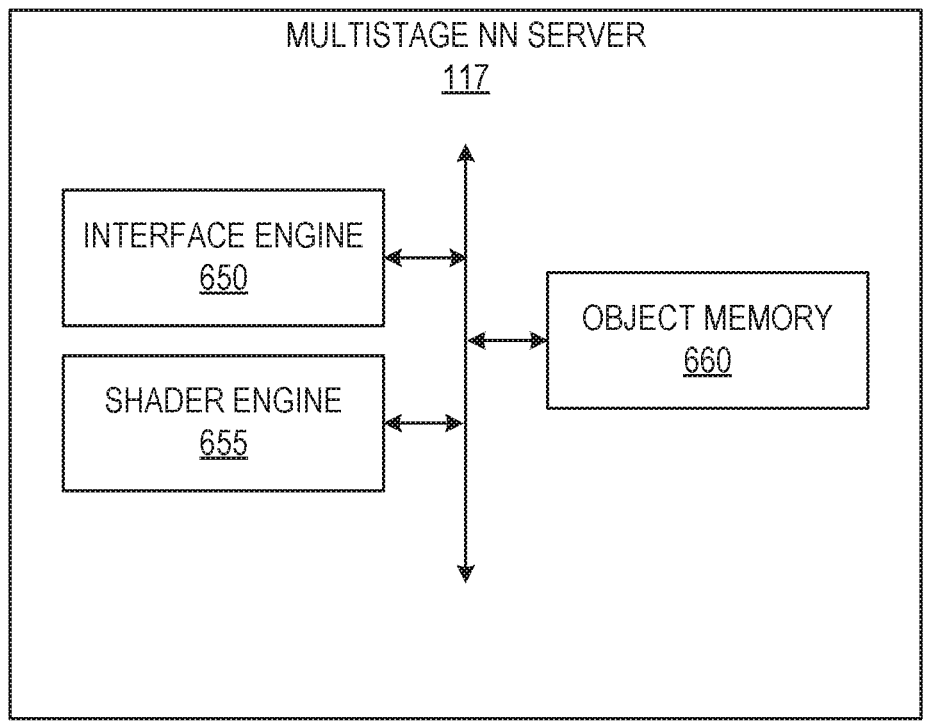
FIG. 6B shows internal functional components of a multistage neural network server, according to some example embodiments.

FIGS. 6A and 6B show example internal functional engines of a multistage NN client 210 and multistage NN server 117, according to some example embodiments. At a high level, the multistage NN client 210 may operate from (e.g., be executed by) a central processing unit (CPU) on the client device 102, and the multistage NN server 117 may operate from (e.g., be executed by) a graphics processing unit (GPU) on the client device 102. Data used by the multistage NN client 210 may be stored on memory accessible to the multistage NN client 210 (e.g., CPU caches or RAM of the client device 102). Data used by the multistage NN server 117 may be stored on memory accessible to the GPU (e.g., graphics card memory or object memory 660 (discussed below with reference to FIG. 6B)). Further example architecture details of the CPU/GPU interface are discussed below with reference to FIG. 7.

FIG. 6A shows internal functional components of a multistage NN client 210, according to some example embodiments. As illustrated, the multistage NN client 210 comprises an image engine 605, a training engine 610, a configuration engine 615, an execution engine 620, and a display engine 625. The image engine 605 manages generating or otherwise identifying an image on the client device 102 (e.g., by interfacing with an image sensor of the client device 102). The training engine 610 manages generating neural network models to generate weights which can be stored as object data (e.g., texture data) on GPU memory. The configuration engine 615 manages storing the weights and transferring the models (e.g., shaders configured to perform neural network processing) to a GPU. The execution engine 620 is a runtime engine that applies the shaders to images captured or otherwise identified by the image engine 605. The display engine 625 is configured to display modified images created by shaders on the GPU. In some example embodiments, the display engine 625 transfers images modified by the shader-based neural networks to the annotation system 206 for further processing and/or publication as an ephemeral message 502.

FIG. 6B shows internal functional components of a multistage NN server 117, according to some example embodiments. As illustrated, the multistage NN server 117 comprises an interface engine 650, a shader engine 655, and an object memory 660. The interface engine 650 is an application programming interface (API) that is configured to receive shader tasks from an application being executed by the execution engine 620 on the multistage NN client 210. The shader engine 655 is configured to execute shaders, e.g., vertex shader, fragment shader, which are mini-programs configured to be executed on one or more shader cores of a GPU. Generally, a fragment is a collection of raster values for a pixel of an image. A fragment shader processes fragments to generate one or more colors and/or a depth value as fragment outputs. Vertex shaders are shaders in a render pipeline that render vertices of a scene (e.g., 3D scene). A vertex shader can an input vertex data item, transform it, and output an output vertex data item that exhibits the transformations in model space. The object memory 660 is memory of a GPU (e.g., physical memory of a graphics card, memory allocated to a GPU integrated on a chip with a CPU). The object memory 660 may be configured to store GPU memory objects, such as textures, vertex arrays, and buffer objects.

Figure 7:
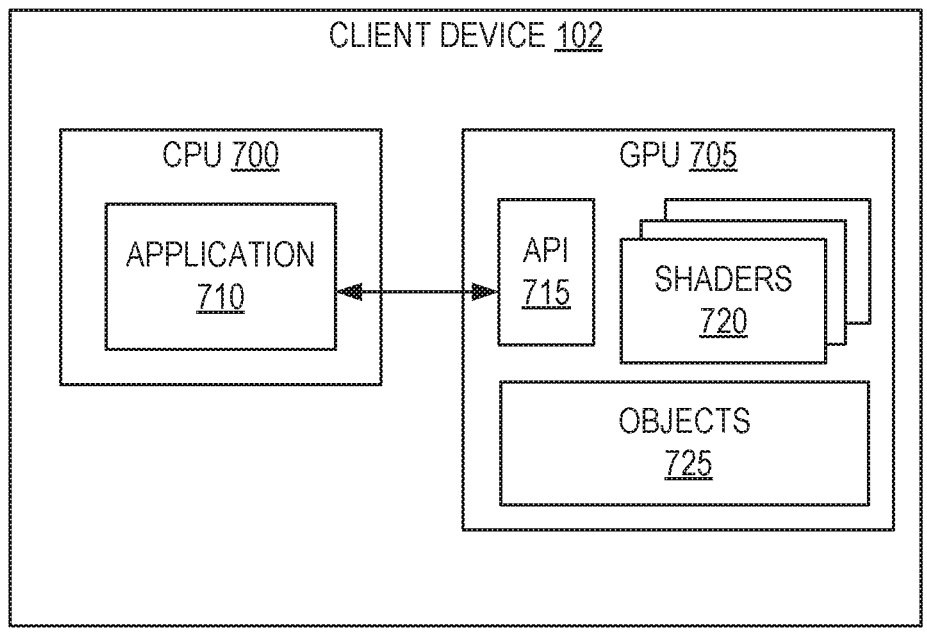
FIG. 7 shows an example internal architecture between two types of processors including a CPU and a GPU on a client device, according to some example embodiments.

FIG. 7 shows an example internal architecture between two types of processors including a CPU 700 and a GPU 705 on a client device 102, according to some example embodiments. As illustrated, the CPU 700 includes an application 710, which may include code configured to execute one or more shaders 720 stored on the GPU 705. The application 710 may be written in a language designed for execution on the CPU 700 (e.g., C++), whereas the shaders 720 may be written in a different language for execution on the GPU 705 (e.g., a shading language, such as GLslang), according to some example embodiments.

The application 710 interfaces with the one or more shaders 720 and objects 725 (e.g., textures) on the GPU 705 through an API 715. In some example embodiments, the components of the GPU 705 are components of a graphics platform, such as OpenGL. The GPU 705 may further contain driver programs (not depicted) configured to execute the graphics platform (e.g., OpenGL) on the hardware components of the GPU 705.

While the GPU 705 is illustrated as being part of the client device 102 in the example illustrated in FIG. 7, it is to be appreciated that in some example embodiments the GPU 705 is located on a machine different from the client device 102. In those example embodiments, the API 715 is network-addressable, and the application 710 can transmit instructions (e.g., shader tasks) to the API 715 over a network (e.g., the network 106).

Figure 8:
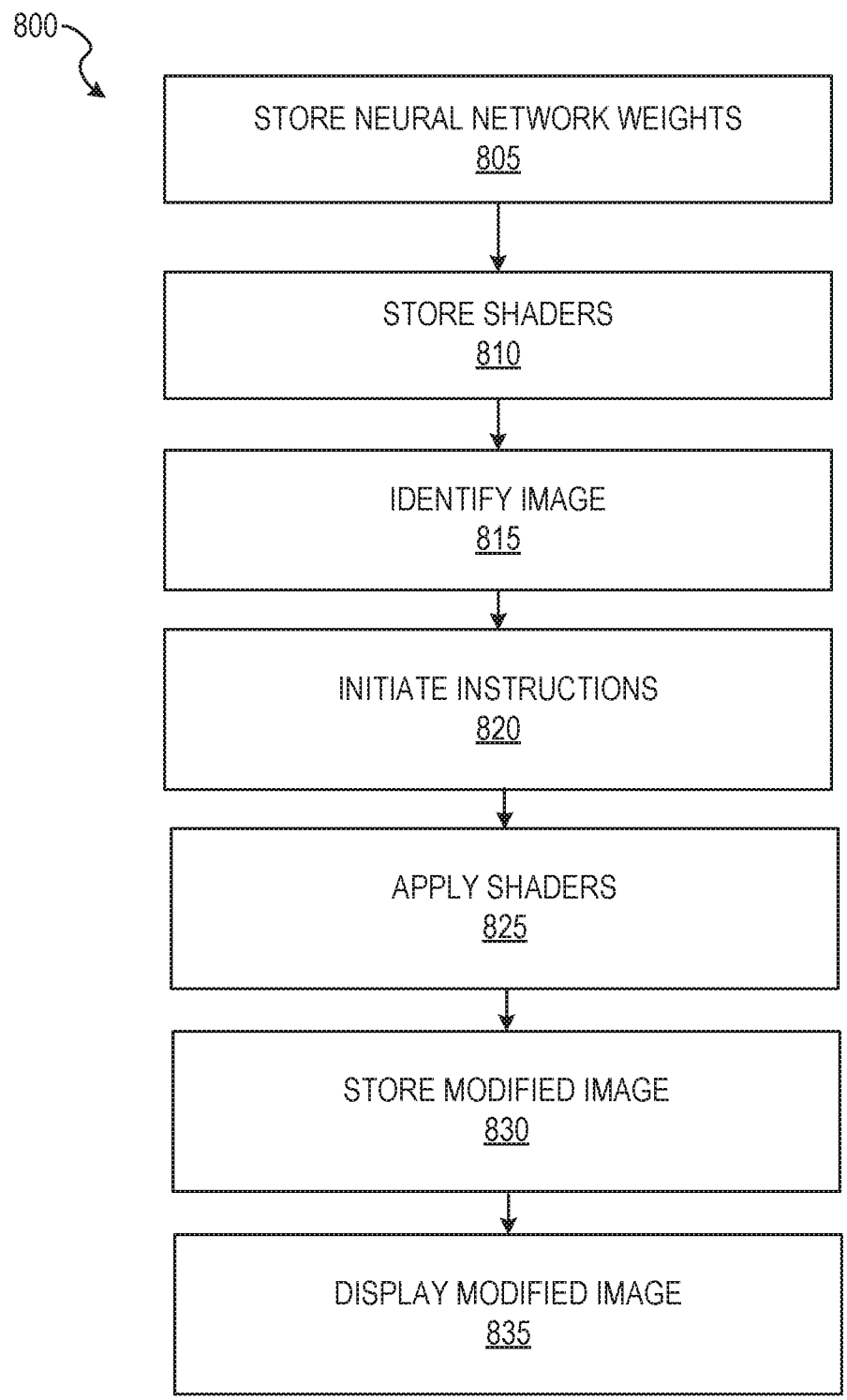
FIG. 8 shows an example flow diagram of a method for implementing multistage neural network processing, according to some example embodiments.

FIG. 8 shows an example flow diagram of a method 800 for implementing multistage neural network processing, according to some example embodiments. At operation 805, the configuration engine 615 stores neural network weights as objects on the object memory 660. In some example embodiments, the weights are stored as texture data or buffer objects on the object memory 660.

The neural network weights are weights generated by training a neural network (e.g., through adjustments made through back propagation, etc.). In some example embodiments, the training engine 610 is configured to generate the weights for a given network by training the neural network on training data. The training engine 610 can train the neural networks and generate the weights from the client device 102, according to some example embodiments. In other example embodiments, the training engine 610 is located on the application server 112 and the neural networks are trained and weights generated on the application server 112, which may have more computational resources than the client device 102 (e.g., more processing power, more memory).

At operation 810, the configuration engine 615 stores one or more shaders on the GPU. The shaders are programs configured to execute on GPU shader cores. In some example embodiments, the shaders are configured to execute code that implements one or more layers of a neural network. The executable code is configured to apply the weights of the trained neural network (e.g., stored as texture data) to process input data and generate neural network vector representations, which may be stored as intermediate data or rendered out as an image for display, according to some example embodiments.

Each neural network to be implemented may have a shader program stored on the GPU and weights stored as texture data on the GPU. For example, an image segmentation neural network may reference one or more instances of a shader program (e.g., an instance running on a shader core) configured to add inputs from an image, modify the inputs using the weights, implement an activation function, and store the output as texture data, which may then be input into one or more other shaders to implement hidden layers, and so on. The output of a given shader-based neural network process may be a modified image, which can then be stored in a frame buffer on the GPU and/or transmitted to the display engine 625 for display on the client device 102.

An example shader is included below. The example shader is an OpenGL shader that adds two input textures element by element and stores the result into the output texture.

```
::::CODE BEGIN::::
layout(local_size_x = THREADS_X, local_size_y = THREADS_Y,
local_size_z = THREADS_Z) in;
layout(binding=0, rgba16f) uniform mediump readonly restrict
image2DArray inImage;
layout(binding=1, rgba16f) uniform mediump writeonly restrict
image2DArray outImage;
layout(binding=2, rgba16f) uniform mediump readonly restrict
image2DArray inImage2;
void main( )
{
    ivec3 pos = ivec3(gl_GlobalInvocationID.xyz);
    ivec3 outsize = imageSize(outImage);
    if (pos.x >= outsize.x || pos.y >= outsize.y || pos.z >=
outsize.z) return;
    imageStore(outImage, pos, imageLoad(inImage, pos) +
imageLoad(inImage2, pos));
}
::::CODE END::::
```

At operation 815, the image engine 605 identifies an image. For example, the image engine 605 uses an image sensor (e.g., CMOS, CCD) of the client device 102 to generate one or more images. In some example embodiments, the image is pre-generated and stored on memory of the client device 102. In those embodiments, at operation 815, the image engine 605 identifies the image stored on memory of the client device 102. For example, a user may select the image from a gallery displayed on the client device 102 for neural network image processing. In some example embodiments, a live video feed captured by an image sensor of the client device 102 is being displayed on a display device of the client device 102, and at operation 815 the image engine 605 samples one or more images from the live video feed for neural network processing. Further, according to some example embodiments, the image identified at operation 815 is part of a pipeline implementing real-time neural network image effects, e.g., implemented by the shaders 720 on the GPU 705.

At operation 820, the execution engine 620 initiates instructions. In some example embodiments, at operation 820, the execution engine 620 transmits one or more instructions to the interface engine 650 of the multistage NN server 117 (operating on the GPU). The instructions may include a first instruction to apply a first set of shaders to the image, a second instruction to apply a second set of shaders to the output of the first set of shaders, a third instruction to render and store the image as an output, and/or instructions to perform other additional imaging operations.

At operation 825, the shader engine 655 applies the shaders to the image. The shader engine 655 may include a driver configured to use the hardware of the GPU 705. The driver is specifically configured to execute on a given GPU type (e.g., a given graphics card type). As discussed in further detail below with reference to FIG. 10, although the instructions may list the shader tasks in a given order, the driver of the shader engine 655 may reorder the tasks according to how many shader cores are on the GPU or other considerations.

At operation 830, the modified image generated by the shaders is stored in memory. For example, after one or more neural network stages are performed on the input image, the modified image is stored on memory of the GPU (e.g., the object memory 660 or a frame buffer).

Further, in some example embodiments, additionally or optionally, the modified image is stored in memory accessible to the CPU (e.g., within the multistage NN client 210).

At operation 835, the display engine 625 displays the modified image on a display device (e.g., a screen) of the client device 102. Further, according to some example embodiments, the display engine 625 publishes the modified image as an ephemeral message 502 on a social media network connected to the client device 102.

Figure 9:
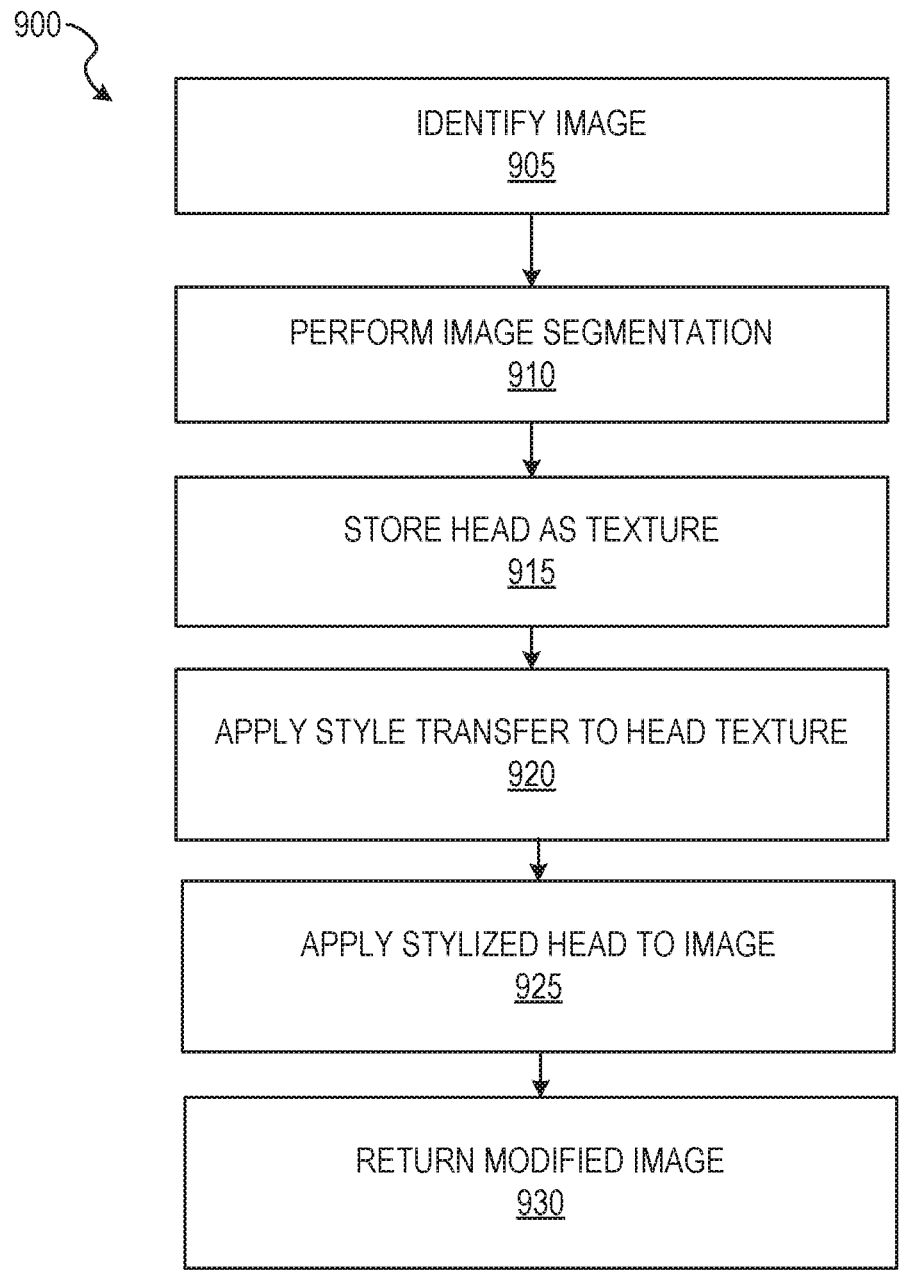
FIG. 9 shows an example flow diagram of a method for performing multistage neural network processing where two or more stages involve different types of neural networks, according to some example embodiments.

FIG. 9 shows an example flow diagram of a method 900 for performing multistage neural network processing where two or more stages involve a first neural network and a second neural network, according to some example embodiments. The first neural network can be a network trained to perform image segmentation. The training data for image segmentation can include an array of images of humans, with the head area labeled. The second neural network can be a neural network trained to perform style transfers, as is known by those having ordinary skill in the art. The training data for style transfer can include a set of images in the target or destination style (i.e., Van Gogh's style, in the below example). The method 900 is an example of a sub-routine applied to complete operation 825 of the method 800 (FIG. 8). At operation 905, the interface engine 650 identifies an image received from the multistage NN client 210 (e.g., an image identified or otherwise generated by the image engine 605). At operation 910, the shader engine 655 performs image segmentation on the image identified at operation 905. As is appreciated by those of ordinary skill in the art, image segmentation is a neural network approach for labeling different areas of an image. For example, the image may depict a human, and the image segmentation performed at operation 910 may label a head area, arm area, torso area, hat area, and so on for later processing.

At operation 915, the shader engine 655 stores the head segment as texture data in the object memory 660. At operation 920, the shader engine 655 applies style transfer using a neural network to the head texture stored in the object memory 660. Style transfer is a neural networking approach for transferring an image in a native style to a different style. For example, a neural network can be trained on images of Van Gogh's Starry Night painting (e.g., minimizing a loss function on pixels of the Starry Night painting), and after training, the neural network can make a photo portrait of a person appear as if the photo was painted in the style of Van Gogh's Starry Night. Returning to operation 920, after being processed by the style transfer neural network shaders, the modified texture is stored as a new texture in the object memory 660 or otherwise replaces the head texture at the same memory location. In some embodiments, while the ordering of the neural network stages may be unspecified and determined by the GPU driver, a sync command can provide some control over the stage ordering where one stage depends on another stage. For example, in particular, operation 920 may be preceded by a sync command originally included in the CPU application instructions that specify that the network applied at operation 920 must wait for the network applied to operation 910 to complete its operations (i.e., segmentation), regardless of driver ordering preference.

At operation 925, the shader engine 655 applies the stylized head to the image, thereby creating a modified image which may be stored in the object memory 660. At operation 930, the interface engine 650 returns the modified image (e.g., depicting the stylized head) to the multistage NN client 210 for further processing (e.g., for display at operation 835).

Figure 10:
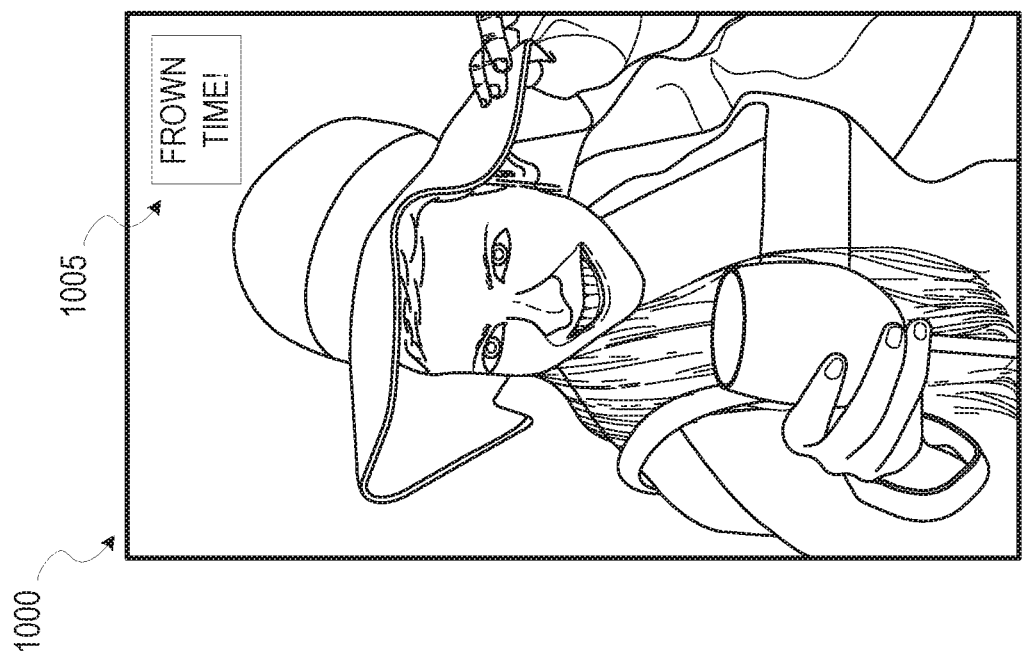
FIGS. 10-12 illustrate example user interfaces for implementing multistage neural network processing, according to some example embodiments.
Figure 11:
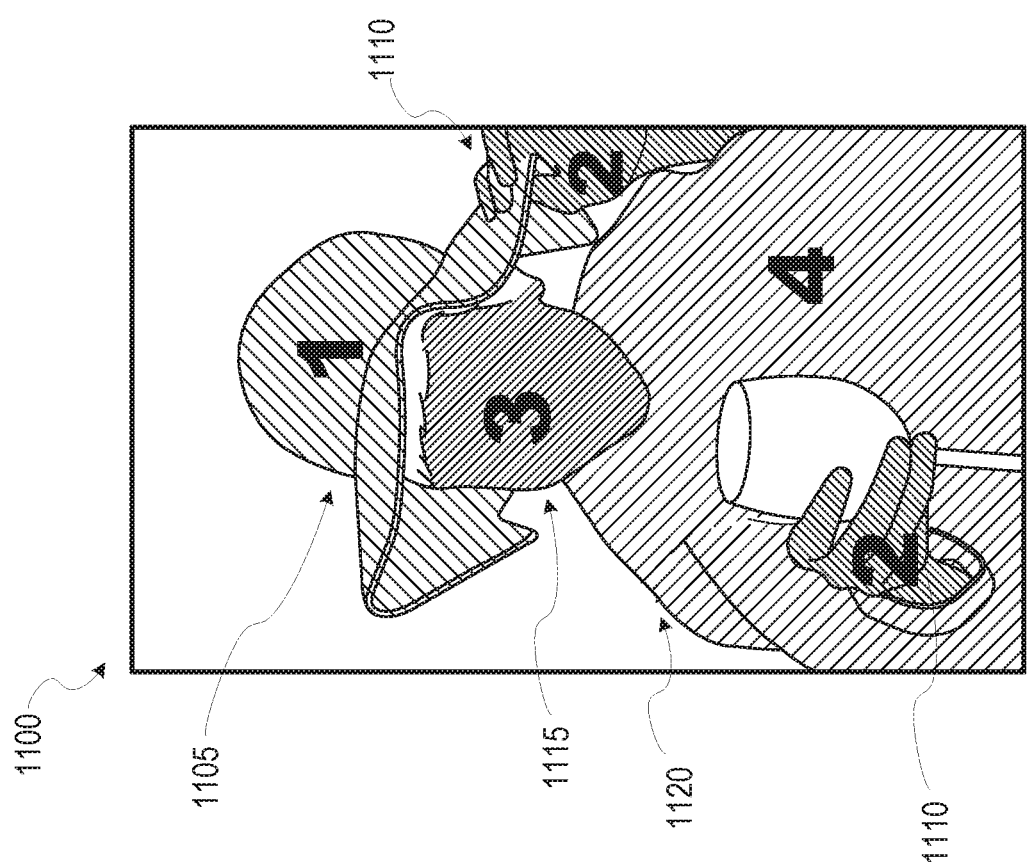
Figure 12:

FIGS. 10-12 illustrate example user interfaces for implementing multistage neural network processing, according to some example embodiments. As illustrated in FIG. 10, an image 1000 is an example of an image captured at operation 815 of FIG. 8. The image 1000 depicts a smiling girl holding her hat and a tasty beverage. A user (e.g., the girl or another person holding a mobile phone taking a picture of the girl) may have selected a button 1005 to initiate styling of the image 1000.

Moving to FIG. 11, in response to selection of the button 1005, the shaders are initiated. As discussed with reference to FIG. 9, a first set of shaders may perform neural network-based image segmentation. FIG. 11 shows a segmented image 1100, which has been derived by performing image segmentation on the image 1000 of FIG. 10. The segmented image 1100 denotes different areas of the image, including for example a hat area 1105 (labeled "1"), skin areas that are not part of the face 1110 (labeled "2"), a face area 1115 (labeled "3"), and a clothes area 1120 (labeled "4"). The different label values may be included as channel data for each pixel (e.g., a fourth channel in addition to RGB (Red/Green/Blue) channels). Further, the label values may be stored as a separate image having the same height and width as the image 1000 (e.g., segmented image 1100 has the same height and width as image 1000). In some example embodiments, the segmented image 1100 is displayed on the display device, while in other embodiments it is not displayed but stored as texture data in the object memory 660 for further processing on the GPU 705.

FIG. 12 shows an example modified image 1200 which has undergone style transfer from a smile style to a frown style using a shader-based neural network. The neural network, as discussed above, may be an additional set of shaders that are trained to perform style transfer using a set of training data of people frowning and smiling, as is understood by one of ordinary skill in the art. Once the shader processes of the multistage NN server 117 are complete, the interface engine 650 transmits the modified image 1200 to the display engine 625 for display or publication as an ephemeral message 502.

Figure 13:
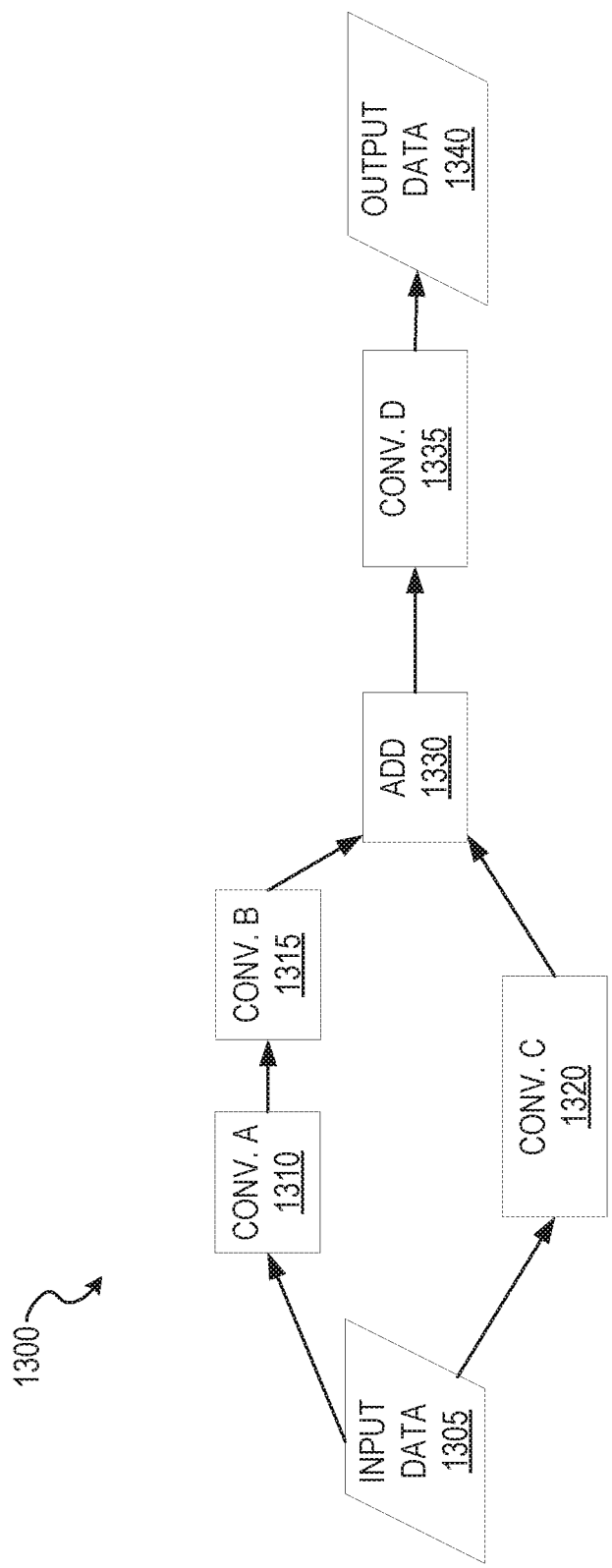
FIG. 13 shows an example graph of operations of a convolutional neural network, according to some example embodiments.

FIG. 13 shows an example graph of operations 1300 of a convolutional neural network, according to some example embodiments. Input data 1305 is an image having dimensions (height×width×channel) of 256×256×3. The input data 1305 is input into a convolutional layer A 1310 which convolutes the input data 1305 using a filter of 3×3×3×16 to produce a 256×256×16 output. The output of convolutional layer A 1310 is input into convolutional layer B 1315, which convolutes the data using a filter of 3×3×16×32 to produce a 256×256×32 output.

The input data 1305 is also input into convolutional layer C 1320 which convolutes the input using a filter of 3×3×3×32 to produce a 256×256×32 output. An add layer 1330 adds the data output from convolutional layer B 1315 and convolutional layer C 1320 element-wise to produce a 256×256×32 output. The output of the add layer 1330 is input into convolutional layer D 1335, which convolutes the data input using a filter of 3×3×32×3 to produce a 256× 256×3 output, which is then stored as output data 1340.

As mentioned, the application may list the shader tasks (e.g., convolutional layer A 1310, convolutional layer B 1315, convolutional layer C 1320) in a certain order. Although the application lists the shader tasks in a specified order, the shader engine 655 may execute the shader tasks in a different order, based on available resources and the GPU driver. For example, assume that the application lists or specifies that convolutional layer C 1320 (a large task) be executed first, followed by convolutional layer A 1310 and convolutional layer B 1315 (two smaller tasks). Due to the number of shader cores available, the shader engine 655 may perform the tasks in another order different from the specified order. For example, the shader engine 655 may execute convolutional layer A 1310 followed by convolutional layer B 1315, to complete them first, and then execute convolutional layer C 1320, a large job that uses more shader cores.

In some example embodiments, the client device 102 captures a video feed, and NN-based image effects are applied and displayed on the client device 102 in real time or near real time. For example, an OpenGL texture/buffer (e.g., doubled buffered rendering) is created, and before drawing initiates, the NN-shader programs modify the objects in the buffer, all on the GPU side (e.g., within OpenGL). Performing multiple tasks on the GPU side before returning results (e.g., sending to the CPU for display) can speed up processes and allow real-time NN-based video effects.

In some example embodiments, one or more of the NN tasks in a multitask process is not texture based. For example, on the GPU (e.g., in OpenGL) a neural network can be configured to generate a plurality of points in 3D space in a GL buffer. The generated points can then be input into another network while still in OpenGL that performs texture-based NN operations, as discussed above, using the generated points. The resulting images can then be displayed on the display device of a smartphone in real time or near real time.

This approach is advantageous because, in contrast to past approaches, a new command buffer need not run each NN. Further, it is not a requirement to put all NN tasks into a single command buffer and commit the command buffer. Instead, the primary application can include an instruction to perform one or more NN tasks, send the tasks to the GPU via an API, and let the GPU driver decide the ordering of the tasks (i.e., without a command buffer commit).

Figure 14:
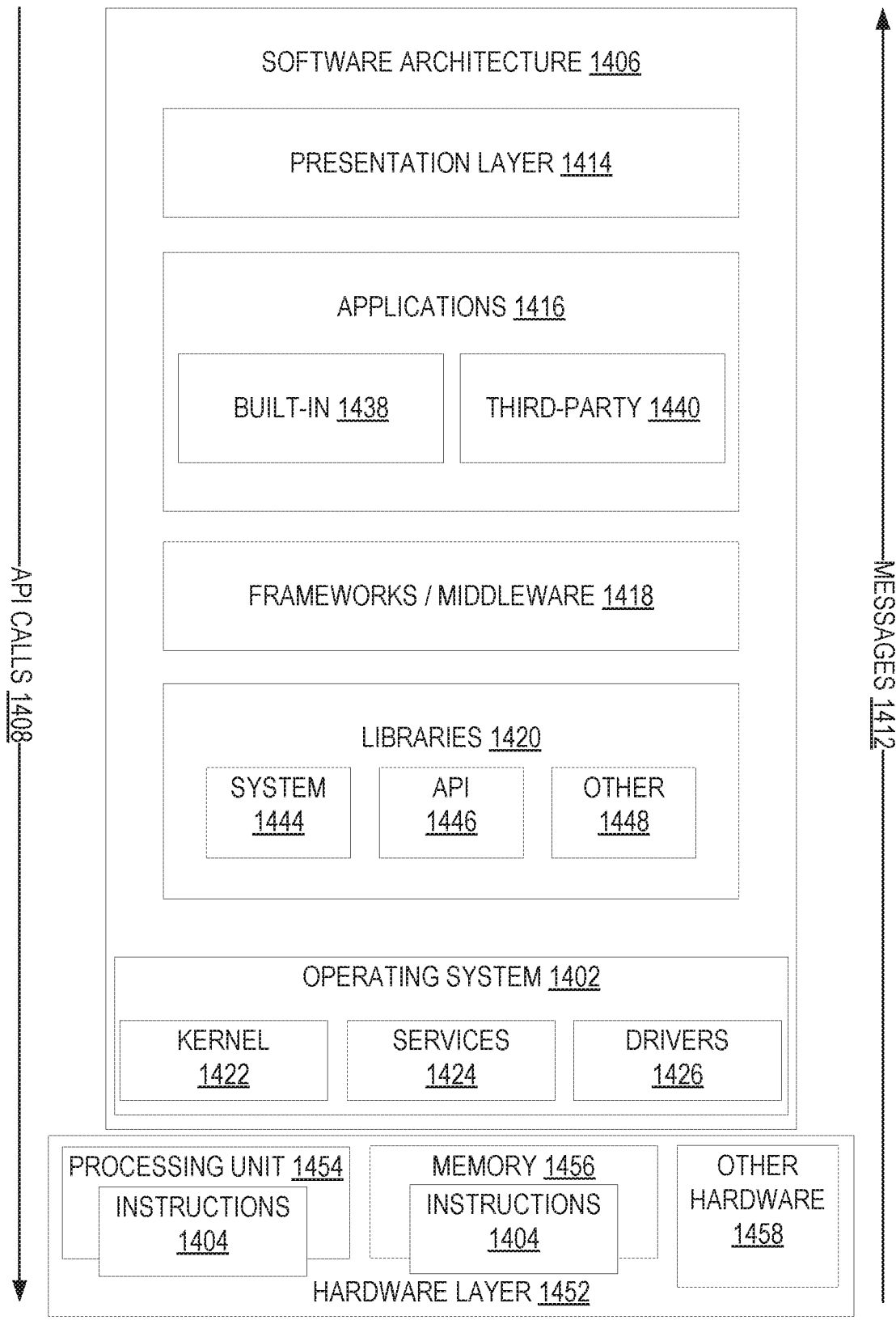
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture, and it will be appreciated that many other architectures may be implemented to facilitate the functionality described herein. The software architecture 1406 may execute on hardware such as a machine 1500 of FIG. 15 that includes, among other things, processors, memory, and I/O components. A representative hardware layer 1452 is illustrated and can represent, for example, the machine 1500 of FIG. 15. The representative hardware layer 1452 includes a processing unit 1454 having associated executable instructions 1404. The executable instructions 1404 represent the executable instructions of the software architecture 1406, including implementation of the methods, components, and so forth described herein. The hardware layer 1452 also includes a memory/storage 1456, which also has the executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1416, and a presentation layer 1414. Operationally, the applications 1416 and/or other components within the layers may invoke API calls 1408 through the software stack and receive a response in the form of messages 1412. The layers illustrated are representative in nature, and not all software architectures have all layers. For example, some mobile or special-purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than by interfacing directly with the underlying operating system 1402 functionality (e.g., kernel 1422, services 1424, and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 provide a higher-level common infrastructure that may be used by the applications 1416 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. The third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as the operating system 1402) to facilitate functionality described herein.

The applications 1416 may use built-in operating system functions (e.g., kernel 1422, services 1424, and/or drivers 1426), libraries 1420, and frameworks/middleware 1418 to create user interfaces to interact with users of the system. Alternatively, or additionally, in some systems, interactions with a user may occur through a presentation layer, such as the presentation layer 1414. In these systems, the application/component "logic" can be separated from the aspects of the application/component that interact with a user.

Figure 15:
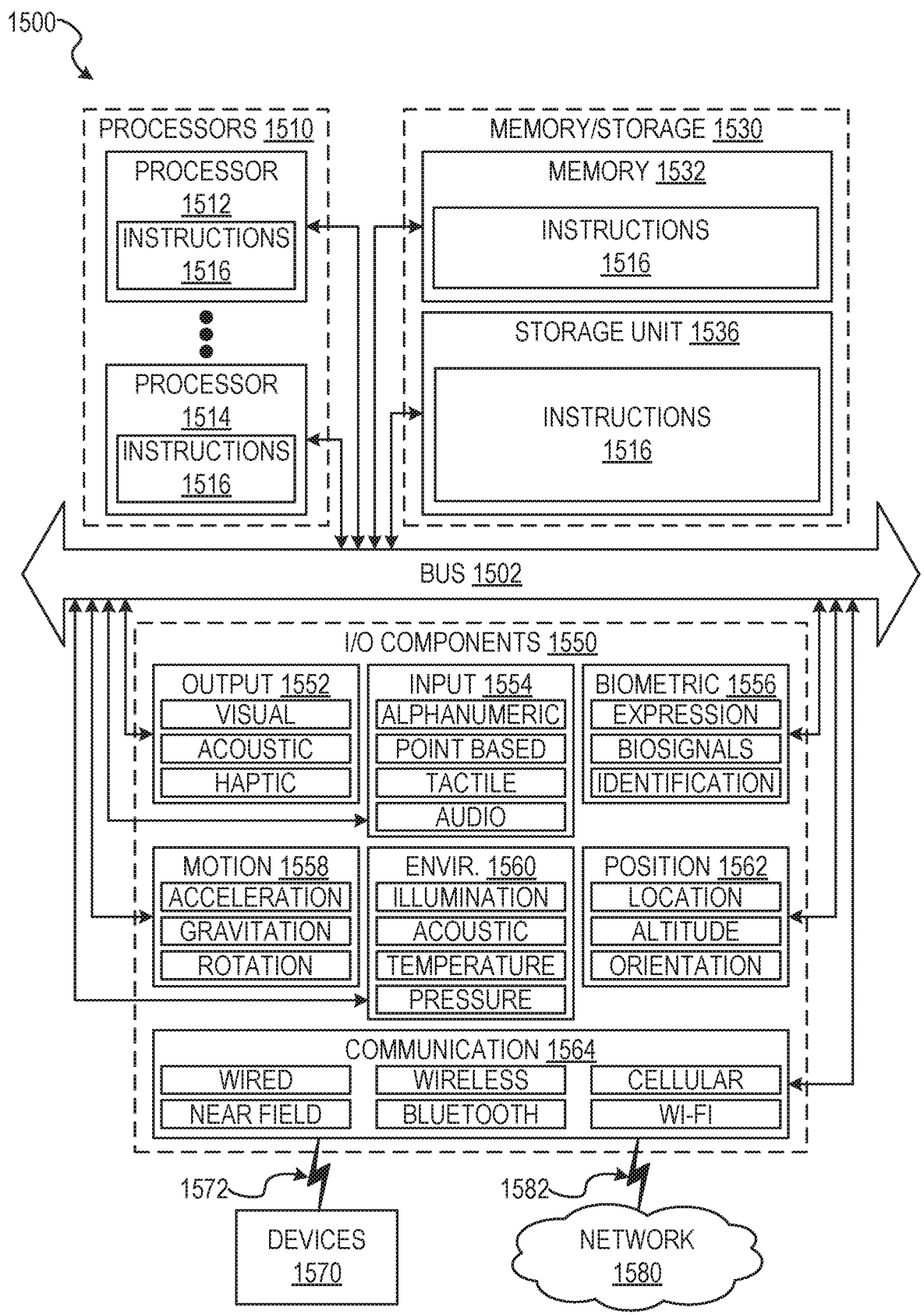
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. As such, the instructions 1516 may be used to implement modules or components described herein. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor cache memory accessible to processors 1512 or 1514), or any suitable combination thereof, during execution thereof by the machine 1500. Accordingly, the memory 1532, the storage unit 1536, and the memory of the processors 1510 are examples of machine-readable media.

The I/O components 1550 may include a wide variety of components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion, and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environment components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environment components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or other suitable device to interface with the network 1580. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1516 for execution by the machine 1500, and includes digital or analog communications signals or other intangible media to facilitate communication of such instructions 1516. Instructions 1516 may be transmitted or received over the network 1580 using a transmission medium via a network interface device and using any one of a number of well-known transfer protocols.

"CLIENT DEVICE" in this context refers to any machine 1500 that interfaces to a network 1580 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1580.

"COMMUNICATIONS NETWORK" in this context refers to one or more portions of a network 1580 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1516 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions 1516 (e.g., code) for execution by a machine 1500, such that the instructions 1516, when executed by one or more processors 1510 of the machine 1500, cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1512 or a group of processors 1510) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1500) uniquely tailored to perform the configured functions and are no longer general-purpose processors 1510. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1512 configured by software to become a special-purpose processor, the general-purpose processor 1512 may be configured as respectively different special-purpose processors (e.g., comprising different hardware components) at different times. Software accordingly configures a particular processor 1512 or processors 1510, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1510 that are temporarily configured (e.g., by software) or permanently configured to perform the relevant operations. Whether temporarily or permanently configured, such processors 1510 may constitute processor-implemented components that operate to perform one or more operations or functions described herein. As used herein, "processor-implemented component" refers to a hardware component implemented using one or more processors 1510. Similarly, the methods described herein may be at least partially processor-implemented, with a particular processor 1512 or processors 1510 being an example of hardware. For example, at least some of the operations of a method may be performed by one or more processors 1510 or processor-implemented components. Moreover, the one or more processors 1510 may also operate to support performance of the relevant operations in a "cloud computing" environment or as a "software as a service" (SaaS). For example, at least some of the operations may be performed by a group of computers (as examples of machines 1500 including processors 1510), with these operations being accessible via a network 1580 (e.g., the Internet) and via one or more appropriate interfaces (e.g., an API). The performance of certain of the operations may be distributed among the processors 1510, not only residing within a single machine 1500, but deployed across a number of machines 1500. In some example embodiments, the processors 1510 or processor-implemented components may be located in a single geographic location (e.g., within a home environment, an office environment, or a server farm). In other example embodiments, the processors 1510 or processor-implemented components may be distributed across a number of geographic locations.

"PROCESSOR" in this context refers to any circuit or virtual circuit (a physical circuit emulated by logic executing on an actual processor 1512) that manipulates data values according to control signals (e.g., "commands," "op codes," "machine code," etc.) and which produces corresponding output signals that are applied to operate a machine 1500. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1510 may further be a multi-core processor 1510 having two or more independent processors 1512, 1514 (sometimes referred to as "cores") that may execute instructions 1516 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
receiving, by a graphics processing unit (GPU), neural network weights for storage in memory of the GPU;
receiving, by the GPU, a set of shaders for storage in the GPU memory, the set of shaders configured to apply a neural network using the neural network weights, wherein the neural network weights comprises a first set of neural network weights and a second set of neural network weights, and the set of shaders comprises a first set of shaders and a second set of shaders, the first set of shaders configured to apply a first neural network using the first set of neural network weights and the second set of shaders configured to apply a second neural network using the second set of neural network weights;
receiving, by the GPU, one or more input images generated using an image sensor;
receiving, by the GPU, instructions to apply the first set of shaders before the second set of shaders;
reordering, by a GPU driver of the GPU, the instructions such that the second set of shaders is applied before the first set of shaders;
applying, by the GPU, the set of shaders to the one or more input images; and
displaying, on a display device, one or more modified images generated by applying the set of shaders to the one or more input images.

2. The method of claim 1, wherein the GPU driver reorders the instructions based on a native configuration of the GPU driver.

3. The method of claim 2, wherein the native configuration of the GPU includes a quantity of shader cores in the GPU, wherein the GPU driver reorders the instructions based on an available quantity of the shader cores in the GPU.

4. The method of claim 1, wherein the GPU driver reorders the instructions based at least in part on the instructions not including a sync command.

5. The method of claim 1, wherein the instructions are received by the GPU via an application programming interface (API).

6. The method of claim 1, wherein the neural network weights are stored in the GPU as one or more of: texture data, a texture buffer object, or shader storage buffer objects.

7. The method of claim 1, wherein the neural network weights are generated by training a first neural network on training data, the training not occurring on a device including the GPU.

8. The method of claim 1, further comprising receiving, from a server, the neural network weights.

9. The method of claim 1, further comprising:
publishing the one or more modified images as an ephemeral message on a social network site.

10. The method of claim 1, wherein the neural network comprises a convolutional neural network configured to perform at least one of: image segmentation, object detection, or style transfer.

11. The method of claim 1, wherein the neural network is trained to perform image segmentation using a plurality of images of humans, with head areas labeled.

12. A device comprising:
a general processing unit;
a graphics processing unit (GPU);
a memory storing instructions that, when executed by the general processing unit cause the device to perform operations comprising:
transmitting, by the general processing unit of the device, neural network weights to the graphics processing unit (GPU) for storage in memory of the GPU;
transmitting, by the general processing unit, a set of shaders for storage in the GPU memory, the set of shaders configured to apply a neural network using the neural network weights;
receiving one or more input images generated by using an image sensor of the device;
transmitting, by the general processing unit, instructions to the GPU to apply the set of shaders to the one or more input images; and
displaying, on a display device of the device, one or more modified images generated by the GPU by applying the set of shaders to the one or more input images.

13. The device of claim 12 wherein the neural network weights comprises a first set of neural network weights and a second set of neural network weights, and the set of shaders comprises a first set of shaders and a second set of shaders, the first set of shaders configured to apply a first neural network using the first set of neural network weights and the second set of shaders configured to apply a second neural network using the second set of neural network weights.

14. The device of claim 13, wherein the instructions specify that the first set of shaders are to be applied before the second set of shaders.

15. The device of claim 14, wherein a GPU driver of the GPU reorders the instructions such that the second set of shaders is applied before the first set of shaders.

16. The device of claim 12, wherein the neural network weights are stored in the GPU as one or more of: texture data, a texture buffer object, or shader storage buffer objects.

* * * * *